E. Blunt,
Steam-Boiler Water-Filter.
Nº 6,650.   Patented Aug. 14, 1849.
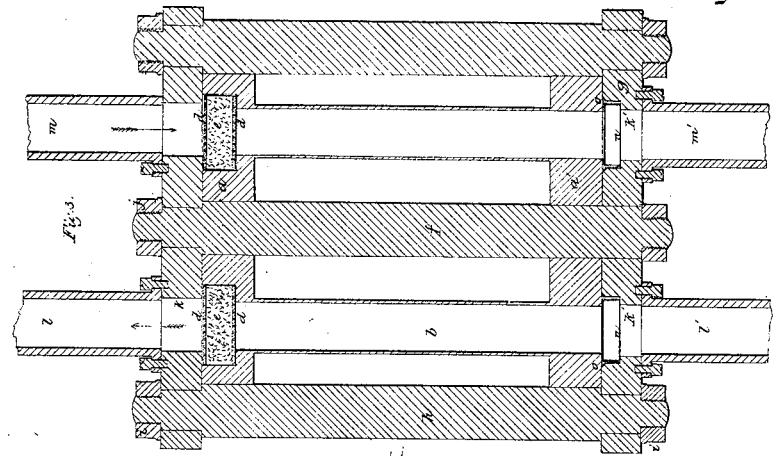
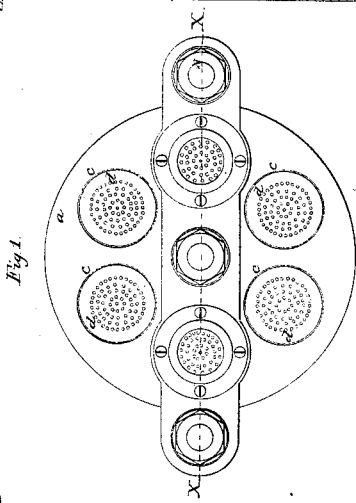
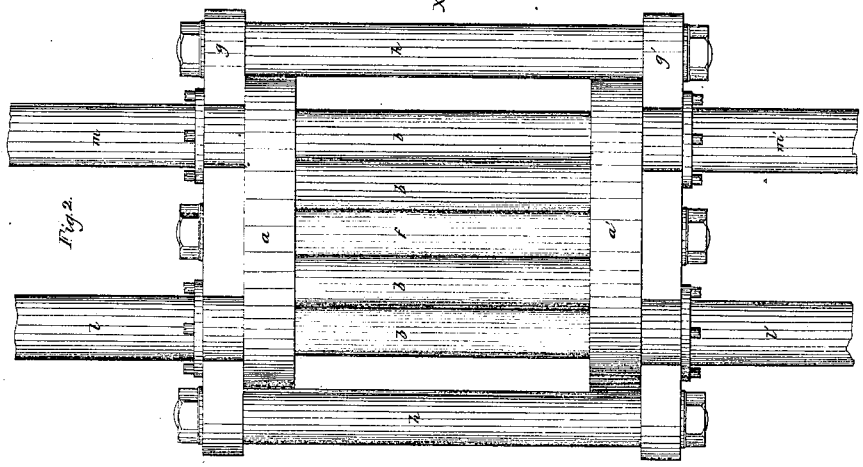

UNITED STATES PATENT OFFICE.

EDMUND BLUNT, OF NEW YORK, N. Y.

ARRANGEMENT OF FILTERS FOR STEAM-BOILERS.

Specification of Letters Patent No. 6,650, dated August 14, 1849.

*To all whom it may concern:*

Be it known that I, EDMUND BLUNT, of the city, county and State of New York, have invented certain new and useful Improvements in the Method of Filtering the Feed-Water of Steam-Boilers, and that the following is a full, clear, and exact description of the principle or character which distinguishes them from all other things before known and of the manner of making, constructing, and using the same, reference being had to the accompanying drawings, making part of this specification, in which—

Figure 1 is a plan of the filtering apparatus; Fig. 2, an elevation; and Fig. 3, a vertical section thereof taken at the line (X, X) of Fig. 1.

The same letters indicate like parts in all the figures.

Many attempts have heretofore been made to filter the feed water by forcing it through a filter before it reaches the boiler, to prevent the solid matter held in mechanical suspension in the water from being deposited in the boiler, but so far as I am informed all these attempts have been attended with practical difficulties for the reason that the filtering medium soon becomes clogged and the pores so much closed up by the solid matter separated as to prevent the passage of water, which requires the supply pump to be stopped and the parts to be disconnected to give access to the filter to clean it out, an operation which has been impracticable while the boiler is in operation.

The object of my invention is to avoid the difficulties heretofore experienced in the use of filters for filtering the feed water of steam boilers, and to this end the first part of my invention consists in using in combination with the feed or supply pipe of steam boilers and between the boiler and the supply pump or pumps a series of two or more filters, so adapted and arranged that after one filter has been used the feed or supply water can be made to pass through another filter and thus admit of cleaning the filters without interrupting the supply of water to the boiler.

And the second part of my invention which relates to the cleaning of the filters consists in connecting the series of filters with the blow off pipe of a steam boiler that the water forced out of the boiler may be forced through the filters in the reversed direction for the purpose of cleaning them out.

In the accompanying drawings ($a$, $a'$) represents two disks connected together by a series of short tubes ($b$) arranged at equal distances apart and concentric with the central holes in the disks. The upper disk ($a$) is made with a series of holes ($c$) concentric with and of larger diameter than the bore of the tubes ($b$), and in each of these are fitted two perforated disks ($d$, $d$) with any kind of filtering medium ($e$) interposed. The parts thus put together constitute a series of filters which can rotate about a shaft ($f$) which passes through the central holes of the two disks, and through two plates ($g$, $g'$) connected together at the ends by two parallel bars ($h$, $h$) with screw nuts ($i$, $i$) at the ends or otherwise firmly connected together. The upper plate ($g$) is pierced with two holes ($k$, $k$) one on each side of the shaft and at the same distance therefrom as the bore of the tubes, and to one of these holes ($k$,) is fitted a section of the feed pipe ($l$) leading to the boiler and to the other a section of the blow off pipe ($m$) leading from the boiler. And the lower plate ($g'$) is in every particular similar to the upper one ($g$), except that the inner part of the holes ($k'$, $k'$) in it are enlarged to receive each a ring ($n$), which has an inner flange ($o$) so that the upward current of water shall act against it and tend to force the rings up against the outer or lower face of the lower disk to pack and prevent the escape of water at the junction of the plate and disk. The packing rings ($n$) should be made in sections in the usual way of making metallic packing rings, but any other kind of packing may be substituted.

To the lower hole in the lower plate are secured two sections of pipes ($l'$, $m'$), one leading from the supply or feed pump or pumps, and the other leading to any desired point for the delivery of the blow off water. One of the series of filters being in connection with the supply pipes ($l$, $l'$), and another with the blow off pipes ($m$, $m'$), the operation will be as follows: As the supply water from the feed pump passes through the pipe ($l'$) and tube ($b$) it is forced through the filter and the pure water thence goes through the supply pipe ($l$) to the boiler, the mud and other impurities separated therefrom remaining in the tube ($b$), which for that reason is denominated the mud tube. So soon as the filter has become clogged by the accumulation of the impurities, the disks are turned to remove this filter and to bring a clean one in line with the supply pipe, when the mud and other matter will be free to drop out of the mud tube, after the one which has been removed, and finally when this comes in line with the blow off, the blow off water from the boiler is made to pass through the filtering medium in the reversed direction of the supply water which has the effect to clean out the pores of the filtering medium, and leave it in a condition to be again brought around in turn to the supply pipe. The force of the current of supply water in passing through the filter forces the upper perforated disk ($d$) against the under surface of the plate ($g$) which has the effect to pack the joint and prevent the escape of water at the junction of the disk ($a$) and plate ($g$). As the holes in the two plates ($g$, $g'$) are at the same distance as the series of filters from their axes of rotation, it will be obvious that by turning the shaft the whole series of filters can be brought in succession in a line with the supply and the blow off pipes, and that in this way after one filter has been sufficiently used to clog the pores of the filtering medium, it can be shifted and another and clean one brought in line, and that in the same order the filters that have been in use are brought in a line with the blow off pipe to be cleaned. Any desired number of filters can be arranged in this way from two upward, but the number and their positions relatively to the supply and blow off pipes should be such that when one of the filters is in connection with the supply pipe another shall be in connection with the blow off pipe.

Instead of having the filters arranged about an axis to rotate they may be arranged in a line to slide, although it will be found better to arrange them about an axis. I do not however intend to limit myself to the use of a series of shifting filters as the same thing can be accomplished by reversing the arrangement by means of a series of stationary filters with the feed pipe and blow off pipe so arranged with a four or more way cock or other valves that the supply and blow off water can be shifted from one to the other of the series. Nor do I wish to limit myself to the employment of the construction of filters herein above specified, as as other kinds of filters may be substituted, the construction of the filters constituting no part of the invention for which I claim Letters Patent.

It will be obvious from the foregoing that the first part of my invention can be used without the second by employing any desired means of cleaning the filters as they or the supply water is shifted, but it will be found more advantageous to use both parts of my invention in connection.

The shifting of the filters, or of the direction of the water to the filters may be done either by hand, or at given intervals by being connected with the moving parts of the engine, but I make no claim to this and therefore leave the means and the selection of the mode to the discretion of the constructor.

What I claim as my invention and desire to secure by Letters Patent is—

1. The combination of a series of filters with the supply or feed pipe of a steam boiler and placed at some point between the supply pump and the boiler, substantially in the manner and for the purpose specified, whether the series be made to shift to the supply pipe or vice versa.

2. I also claim the above combination of the series of filters and supply or feed pipe in combination with the blow off pipe of steam boilers for the purpose and in the manner specified, and this I claim whether the series of filters be made to shift to the blow off pipe or vice versa, as specified.

EDMUND BLUNT.

Witnesses:
A. P. BROWN,
A. E. PETERS.